Dec. 25, 1923.  
E D WILLIAMS  
COTTON CHOPPER  
Filed Dec. 7, 1921  
1,478,933  
3 Sheets-Sheet 3
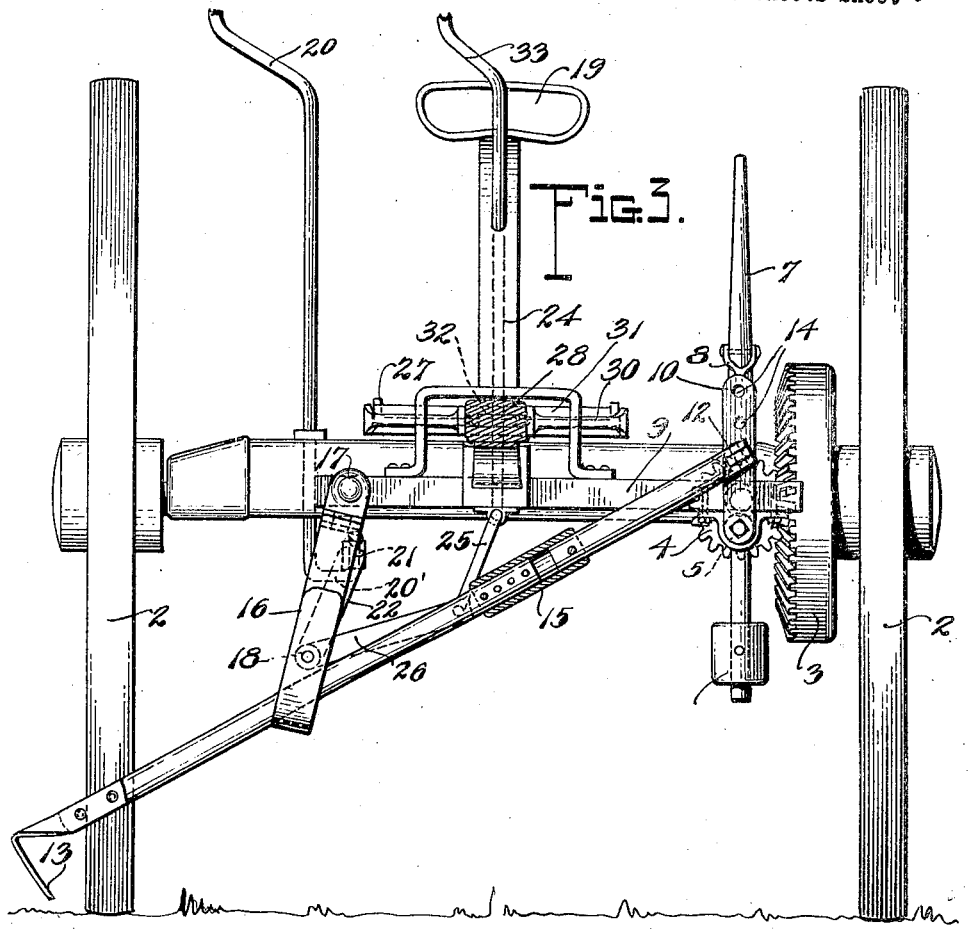
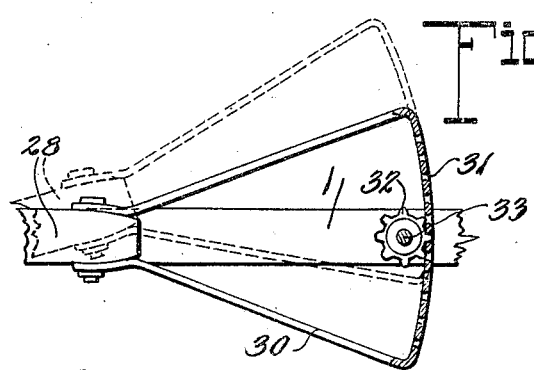
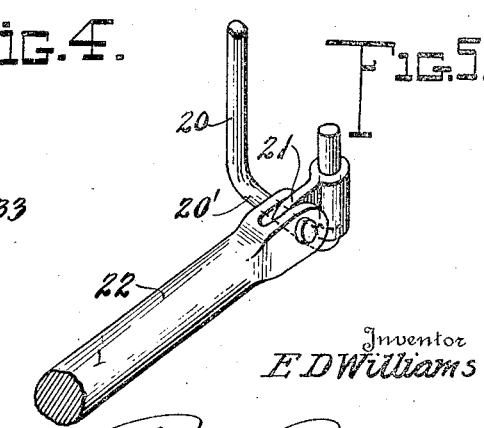
Witness:  
C.H.Wagner,
Inventor  
E D Williams  
By Rolf, Robb & Hill  
Attorneys Patented Dec. 25, 1923.

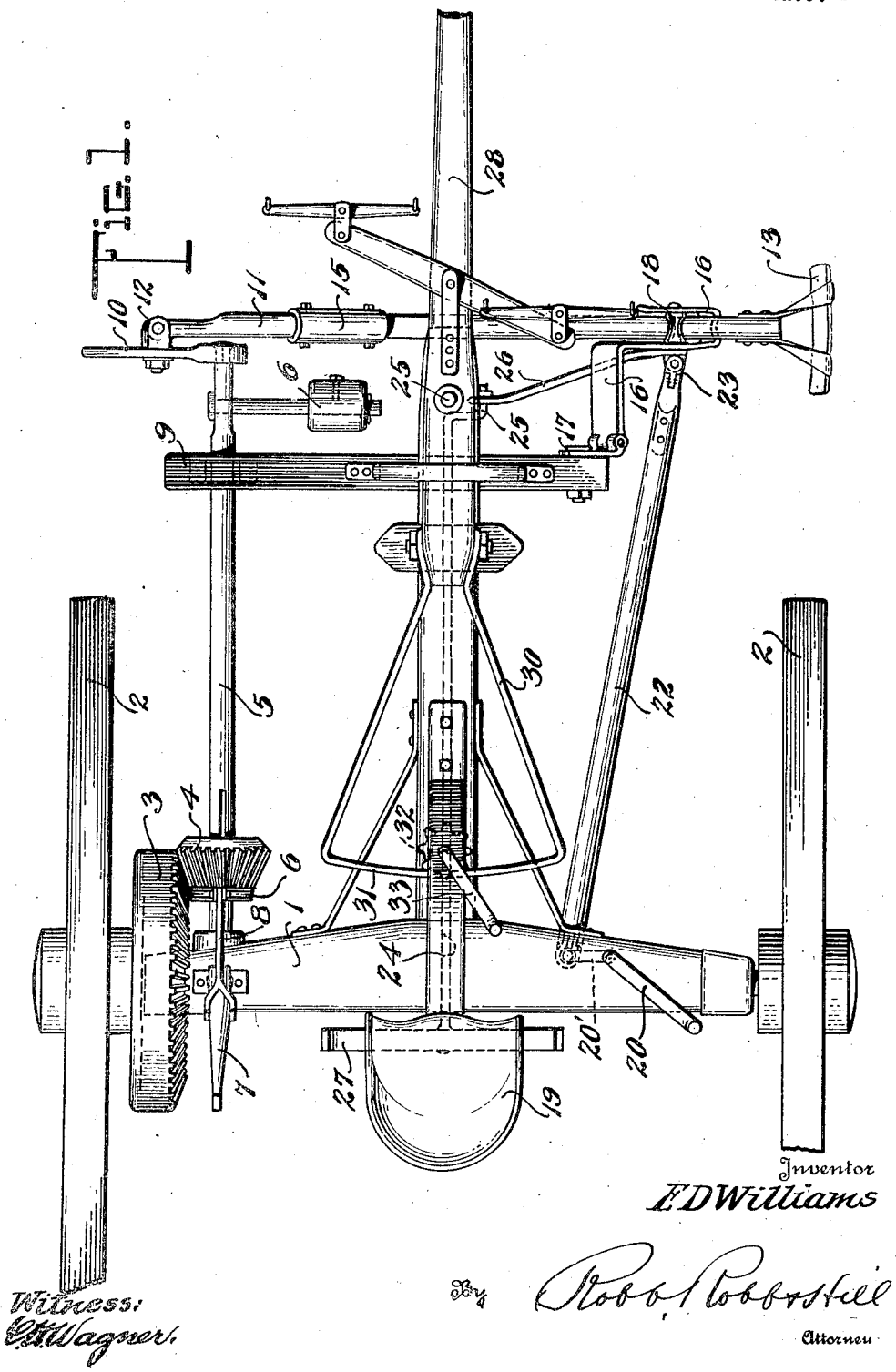

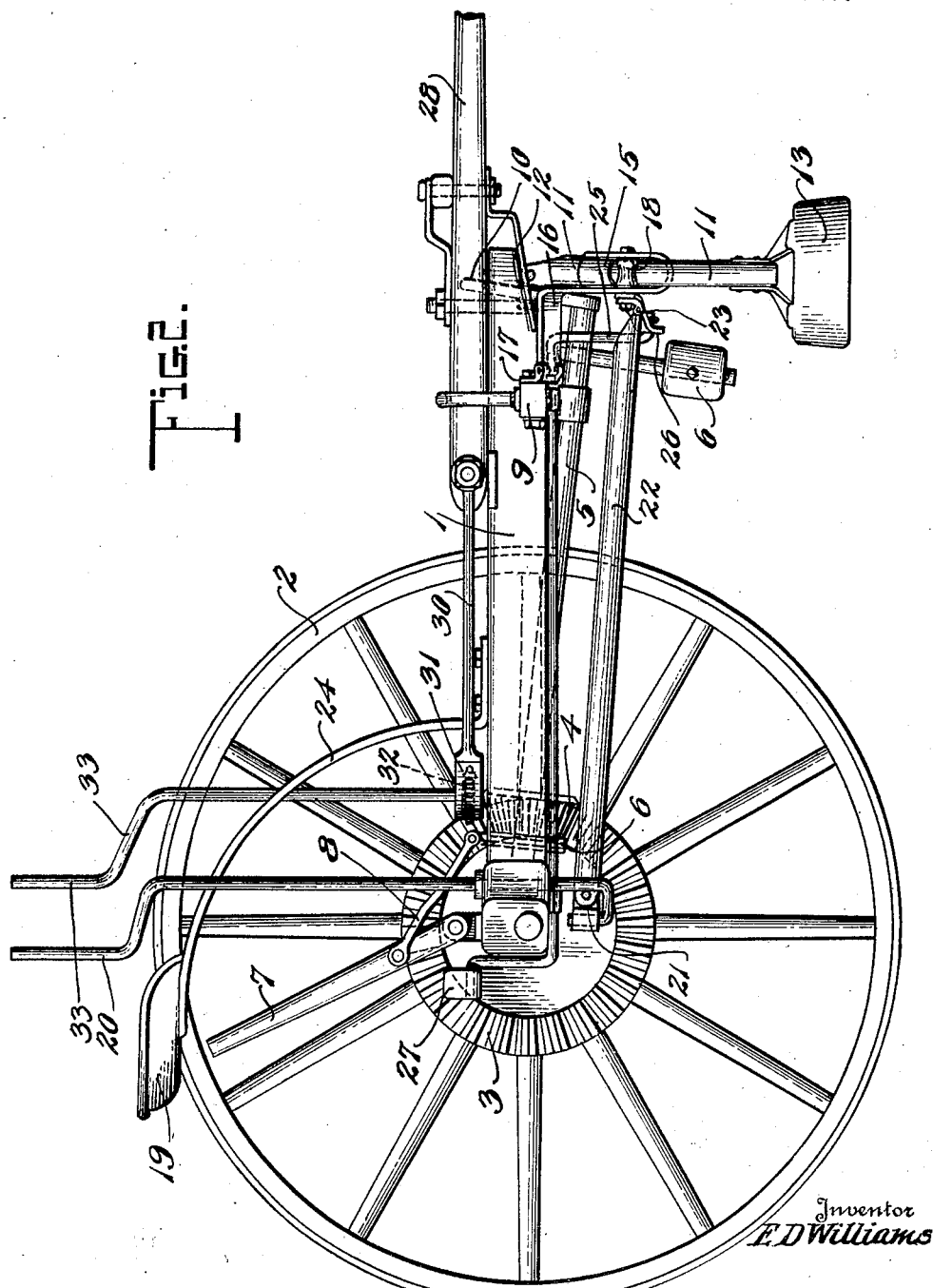

1,478,933

UNITED STATES PATENT OFFICE.

E D WILLIAMS, OF JACKSON, TENNESSEE.

COTTON CHOPPER.

Application filed December 7, 1921. Serial No. 520,673.

*To all whom it may concern:*

Be it known that I, E D WILLIAMS, a citizen of the United States, residing at Jackson, in the county of Madison and State of Tennessee, have invented certain new and useful Improvements in Cotton Choppers, of which the following is a specification.

The present invention appertains to improvements in cotton choppers and it has for its primary object to provide a substantial mechanism by means of which the hand operation of hoeing cotton may be most effectively duplicated mechanically, substantially speaking.

More specifically, the invention embodies a reciprocable hoe and means for shifting the hoe during its chopping operation either forwardly or rearwardly, according to the requirements as affected by the position of the plants, or upwardly and downwardly to control the depth of the chopping action.

It is further an object of my invention to provide means controlling the chopping action by shifting the draft connection of the implement so that I am enabled, without a complication of mechanism, to effectively apply the hoe to work transversely of the row intermediate the plants or to perform the chopping operation at either side of the row, as may be desired.

In the carrying out of my invention, I employ a hoe which is operated from the ground wheels of the implement, the hoe being supported at an intermediate point in its length by a shiftable fulcrum, independent actuating means being provided for shifting said fulcrum support to control either the point of chopping action or the depth thereof, as above specified.

These and such other objects as may hereinafter appear are attained by the novel construction, combination and arrangement of parts to be hereinafter specifically described and claimed.

Reference will now be had to the accompanying drawings forming a part of this specification, wherein:

Figure 1 is a top plan view of an apparatus constructed in accordance with this invention.

Figure 2 is a side elevation thereof.

Figure 3 is a front elevation of the implement, the draft tongue being shown in section.

Figure 4 is a detail view of the adjusting means for the draft tongue.

Figure 5 is a detail view of the preferred form of connection between one of the shifting levers and its connecting rod connecting it to the hoe fulcrum support.

Throughout the following detailed description and on the several figures of the drawing, similar parts are referred to by like reference characters.

Referring to the drawings, the invention comprises a suitable frame 1 mounted upon the ground wheels 2 to one of which is fixed the driving gear 3. Associated with this driving wheel is a suitable clutch mechanism including the beveled pinion 4 splined upon the drive shaft 5 and shiftable by means of the clutch yoke 6 which is in turn operable by means of the lever 7 connected to said yoke by the link 8. The forward extremity of the drive shaft 5 is suitably supported by the cross bar 9 of the frame 1 and the outer end of the shaft carries the crank arm 10 to which the pitman 11 is connected by what may be termed as a universal joint 12. This pitman 11 is actually the hoe handle, carrying at its free end the hoe member 13, and hereafter in this description the parts 11 and 13 will be referred to for simplicity as the hoe. It will be observed that the arm 10 is provided with a series of openings 14 affording an adjustable connection for the hoe which will enable variation of the throw in actual operation. It may be pointed out at this point that the hoe handle is preferably made of sectional form connected by an adjustable coupling 15 so that the length of the hoe may be modified to suit the requirements affected by the distances between the rows of plants.

At an intermediate point the hoe is supported by means of a hanger 16 which depends from the cross bar 9 and slidingly receives the hoe, guiding it in its reciprocating operation under the actuation of the drive shaft 5. This hanger is connected to its supporting bar by a universal joint connection 17 so that it is possible to shift the hanger in a direction longitudinally of the machine as well as transversely thereof for purposes hereinafter more particularly pointed out. A guide roller 18 is mounted in the hanger so as to prevent accidental displacement of the hoe during operation.

One of the special features of this apparatus lies in the method of controlling the operation of the hoe by means of the fulcrum or hanger support 16, as will now be described.

Mounted adjacent to the operator's seat 19 is a vertically disposed shifting lever 20 the lower end of which is connected by the special joint 21, shown most clearly in Figure 5, to the rod 22, the latter being connected by a universal joint 23 to the hanger 16. It will be obvious, owing to the provision of the crank arm 20' on the lower end of the rod 20, that rotation of the rod just mentioned will shift the hanger support either forwardly or rearwardly, which shifting during the operation of the hoe will enable the chopping action to be accordingly controlled as the operator may see desirable in actual use. By this arrangement it will be obvious the operator may shift the hoe so as to prevent the chopping up of a promising plant which would otherwise be destroyed without a variable arrangement such as just referred to.

In addition to this manual adjustment of the hoe forwardly and rearwardly, I provide a second adjusting means which includes the rock shaft 24 mounted beneath the frame of the apparatus and extending longitudinally thereof to a point approximate the hoe where its crank extremity 25 is connected by a link 26 to the fulcrum hanger 16 hereinbefore mentioned. The rear end of this shaft carries a transverse foot piece 27 by means of which the shaft 24 may be rocked in either direction. The operator sitting upon the seat places his feet upon either end of the piece 27 and is thereby enabled to quickly rock the shaft 24 in either direction, which in turn will shift the hanger transversely of the machine or in a direction longitudinally of the hoe. The effect of this movement of the hanger is to change the fulcrum point, and owing to the inclination of the hoe, it will be apparent, speaking with reference to Figure 3, that when the hanger is shifted toward the driving end of the hoe the operating end of the same will be lowered, which in turn increases the depth of cutting action of the hoe, while movement of the hanger in the opposite direction or toward the free end will elevate this latter end and decrease the depth of cutting action of the hoe. To understand this more clearly it will be understood that if the hanger is disposed at a point which is centrally of the hoe the free end thereof will describe a circle corresponding to the circle produced by the connection 12 with the crank arm 10. If now the movement of the hanger is toward this crank end of the hoe the arc of the cutting movement of the hoe will be increased vertically, describing a path, in other words, which is elliptical in form. The movement in the opposite direction will cause just the reverse of this or a shortening of the elliptical path of the cutting element, and this taken in conjunction with the raising and lowering of the hoe materially affects the depth of cutting action. The adjustment of the rock shaft, it will be apparent, furthermore, enables the hoe to be quickly shifted to clear any obstacle that may be in the path of swing of the hoe and therefore prevents likelihood of breakage.

The adjustments of the hoe just described amply take care of the cutting action which is transversely of the row of plants from side to side, but it becomes desirable at times to shift the hoe so that the cutting action may be performed at either side of the row so that for this purpose I have provided a special adjustment of the draft connection or tongue 28 which is pivotally connected to the frame intermediate its length at 29. The rear extremity of the tongue carries a substantially triangular frame 30, the rear side 31 of which is suitably perforated as shown at Figure 4, to form a rack engaging with the gear 32 mounted upon the vertical shifting lever 33 disposed just in advance of the seat 19 for the operator. By this arrangement it will be clear that rotation of the lever 33 will move the rear end of the tongue and correspondingly cause decided side draft which effectively shifts the apparatus bodily with respect to the row or rows of plants over which it is operated. This bodily movement of the apparatus will naturally carry the hoe to one side or the other of the particular row which is being operated upon, so that the chopping action will take place at the desired side.

Thus a very simple arrangement is provided which gives very desirable variations in the operation of the chopping hoe under the quick control of the operator of the device. As a matter of detail I preferably provide the drive shaft 5 with a counterbalancing weight 6 by means of which the force of the chopping action is made effective and the adjustment of the weight may be resorted to to increase or decrease the cutting force according to the particular conditions of the ground at the time of performing the chopping operation.

The form illustrated herein is the preferred embodiment of my invention, but I desire it to be understood that slight changes may be made in the details of construction without departing from the spirit of the invention and within the scope of the claims hereto appended.

Having thus described my invention, what I claim as new and desire to secure by Letters Patent is:

1. An implement of the class described comprising a wheeled support, a hoe, actuating means connected thereto and driven from the support, supporting means depending from the wheeled support and constituting a movable fulcrum for said hoe, shiftable with respect thereto to change the degree of cutting action, as well as raising or lowering of the hoe and means connected to said depending supporting means to shift the hoe longitudinally of the implement to change the plane of chopping action and to effect raising or lowering of the hoe.

2. An implement of the class described comprising a wheeled support, a hoe, actuating means connected to the end of the hoe for imparting chopping action thereto, means slidingly receiving the hoe for sustaining the free end thereof in operative position, and means for shifting said sustaining means to vary either the plane of cutting action or the depth and degree of said action.

3. An implement of the class described comprising a wheeled support, a hoe, actuating means connected to the end of the hoe for imparting chopping action thereto, means slidingly receiving the hoe for sustaining the free end thereof in operative position shiftable both transversely and longitudinally of the wheeled support, and means for shifting said sustaining means in a direction longitudinally of the implement or transversely thereto to control the degree of cutting action of the hoe.

4. An implement of the class described comprising a wheeled support, a hoe, actuating means connected to one end of the hoe for imparting chopping action thereto, a hanger carried by said support and guidingly receiving and sustaining the hoe in operative position, means connected to said hanger to shift the same longitudinally of the hoe for raising and lowering the same, and separate means to shift the hanger forwardly and rearwardly with respect to the wheeled support to change the line of cutting movement.

5. A cotton chopper of the class described comprising a frame, ground wheels therefor, a drive shaft operated by said ground wheels, a hoe mounted transversely of the frame and connected to said drive shaft at one end whereby to impart reciprocatory movement to said hoe, a hanger adjustably sustaining the hoe intermediate its length, a shifting lever mounted upon said frame and operatively connected to said hanger for moving the hoe in one direction, and a rock shaft mounted upon said frame and likewise connected to the hanger for shifting the hoe in another direction.

In testimony whereof I affix my signature.

E D WILLIAMS.